(12) United States Patent
Suzuki

(10) Patent No.: US 6,979,265 B2
(45) Date of Patent: Dec. 27, 2005

(54) GAME SYSTEM AND COMPUTER READABLE STORAGE MEDIUM

(75) Inventor: Gen Suzuki, Nagoya (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/755,305

(22) Filed: Jan. 2, 2001

(65) Prior Publication Data

US 2001/0007826 A1 Jul. 12, 2001

(30) Foreign Application Priority Data

Jan. 7, 2000 (JP) ................................ P2000-5961

(51) Int. Cl.$^7$ ............................................ A63F 13/00
(52) U.S. Cl. ............................... 463/31; 463/43; 463/7
(58) Field of Search ........................... 463/1, 7, 22, 31, 463/29, 43, 44, 8, 23, 32, 33, 36–38; 273/237, 273/138.2, 141 A

(56) References Cited

U.S. PATENT DOCUMENTS

| | | | | |
|---|---|---|---|---|
| 2,026,082 A | * | 12/1935 | Darrow | 273/256 |
| 2,587,381 A | * | 2/1952 | Peterson | 273/141 A |
| 3,425,699 A | * | 2/1969 | D'Onofrio | 273/141 A |
| 3,834,711 A | * | 9/1974 | Breslow | 273/141 A |
| 5,050,883 A | * | 9/1991 | Goldfarb et al. | 463/15 |
| 5,267,734 A | * | 12/1993 | Stamper et al. | 273/148 B |
| 5,417,425 A | | 5/1995 | Blumberg et al. | 273/153 R |
| 5,601,487 A | * | 2/1997 | Oshima et al. | 463/31 |
| 5,954,332 A | | 9/1999 | Mero et al. | 273/236 |
| 6,106,399 A | * | 8/2000 | Baker et al. | 463/42 |
| 6,227,968 B1 | * | 5/2001 | Suzuki et al. | 463/7 |
| 6,267,674 B1 | * | 7/2001 | Kondo et al. | 463/32 |
| 6,283,854 B1 | * | 9/2001 | Niwa | 463/7 |
| 6,331,145 B1 | * | 12/2001 | Sity et al. | 273/138.2 |
| 6,454,653 B1 | * | 9/2002 | Kawazu | 463/43 |
| 6,533,663 B1 | * | 3/2003 | Iwao et al. | 463/32 |

OTHER PUBLICATIONS

IGN.com: Monopoly 64: Do not pass "GO", do not collect $200...without checking out this preview. Aug. 13, 1999 http://ign64.ign.com/articles/131/131445pl.html Screen shots taken from article, direct address listed below.*
Francini, Brad: History of Press Your Luck, (no data clearly established, circa 1983), http://gscentral.net/pylhista.htm.*
Screen shots taken from: http://mediaviewer.ign.com/ignMediaPage.jsp?channel_id=61&object_id=11445&adtag=network=ign&site=n64type%3Dpartnerviewer%26pagetype%3Darticle&page_title=Monopoly%2064.*

* cited by examiner

Primary Examiner—Michael O'Neill
(74) Attorney, Agent, or Firm—Jordan and Hamburg LLP

(57) ABSTRACT

A game system allows a player's wish to influence appearance of event production squares. A game control device functions as various devices, including a device for displaying a route including plural squares and symbols representing attributes of the squares, on a display, a device for determining a value to be obtained by a player based on an instruction of the player via an input device, a device for moving a player character on the route according to the obtained value, a device for controlling a peculiar value corresponding to an attribute of the squares based on a stop position of the character, a device for controlling appearance of event production squares based on the peculiar value, and a device for producing an event relating to the event production square under a condition that the event production square and a stop position of the character establish a predetermined relationship.

22 Claims, 10 Drawing Sheets

CONDITION OF A: ADD EP POINTS OF E AND F
CONDITION OF B: ADD EP POINTS OF G AND H
CONDITION OF C: ADD EP POINTS OF I AND J
CONDITION OF D: ADD EP POINTS OF K AND L
FIG. 1A
FIG. 1B
R1 | A | A | B | A | A | A | C | A | A | B | C | A | A | A | D | A |
R2 | A | B | B | B | C | B | B | B | B | A | B | B | D | B | B | C |
R3 | C | A | C | B | C | D | C | D | C | B | C | A | C | B | C | A |
FIG. 1C

GAME SYSTEM AND COMPUTER READABLE STORAGE MEDIUM

BACKGROUND OF THE INVENTION

1. Field of the Invention

The present invention relates to a game system and a storage medium utilizing a computer.

2. Description of the Related Art

As a board game utilizing a computer, there exists a board game in which lottery device such as a roulette or a dice which is displayed on a screen is operated by a player, and a predetermined piece is advanced along a fixed route by a number obtained by the lottery. In a game of this kind, various events are produced according to positions where the piece stops in the process that the lottery and the advance of the piece are repeated, and changes are made on the proceeding of the game so that pleasure of the game is deepened.

The production of events is controlled, for example, as shown in FIG. 10A. In this example, event production squares A, B and C are previously set on a route R along which pieces advance, and when a piece stops in either of the squares A through C, events corresponding to the squares A through C are produced. In an example shown in FIG. 10B, a plurality of routes R1, R2 and R3 where positions of event production squares A, B and C are different to each other are previously prepared, and one route which is selected randomly from these routes is displayed on a game screen, and when a piece stops one of the event production squares A, B and C, an event corresponding to the square is produced.

In the above-mentioned conventional event production method, a game creator previously determines as to what kind of event production squares is set on a route, and a player cannot participate in the determination. There exists an example that positions of the event production squares on a route are changed randomly, but also in the case, a player cannot participate in the appearance of the event production squares. Each event production square is related to each event respectively, and for example even if a player wants to experience the event related to the event production square A, this is impossible unless the event production square A is arranged on the next route downward. Following games are likely to become dreary.

SUMMARY OF THE INVENTION

It is an object of the present invention to provide a game system which is capable of allowing player's wish to reflect on production of events more effectively than conventional game systems, and a computer readable storage medium which is suitably used in the game system.

There will be explained below the present invention.

In order to solve the above problems, a game system of the present invention includes: an image display device; an input device for outputting a signal according to an operation by a player; and a game control device for executing a game according to a predetermined program while checking the output of said input device and displaying a game picture according to a proceeding situation of the game on the display device, and the game control device includes: route presenting device for displaying a route composed by arranging a plurality of squares as well as symbols representing attributes allocated to the respective squares on a screen of the display device; lottery device for determining a value to be obtained by the player based on the instruction of the player via the input device; character position control device for moving a character set as an object to be operated by the player along the route according to the value determined by the lottery device; peculiar value control device for controlling an peculiar value relating to event production corresponding to the attributes of the squares based on a stop position of the character; event production square appearance control device for controlling appearance of the event production squares on the route based on the peculiar value; and event production control device for producing an event relating to the event production square under the condition that the event production square and the stop position of the character establish a predetermined relationship.

According to this invention, a square where the character stops is changed according to the value obtained by the player via the lottery device, and the peculiar value relating to event production is controlled according to the stop position, and the appearance of the event production squares is controlled based on the peculiar value. Since the lottery device determines a value based on the instruction by the player via the input device, this provides some room for the player to participate in the stop position of the character. As a result, the player can participate in the appearance of the event production squares. Therefore, the player's will can be reflected on the event production more effectively than the conventional technique, and the game can proceed according to the player's wish, and thus a wide range of game proceedings can be provided according to player's preference.

In the game system of the present invention, the player's operation skill via the input device preferably reflects on the determination of the value via the lottery device. As a result, the player can display the skill with respect to the stop position of the character, and the appearance of the event production square is controlled according to the player's skill. As a result, the player's skill can reflect on the proceeding of the game more strongly, thereby providing more succulent game in comparison with the case that the proceeding of a game is led by fortuity.

The lottery device may include: scrolling device for scrolling a row of numerical values in a predetermined range on the screen of the display device at a speed in a range that respective values can be discriminated; and value determination device for selecting the value to be obtained by the player from the row of the scrolled numerical values so that a constant relationship is established between timing that a predetermined stop operation as the instruction is performed on the input device and the determination of the value. As a result, the lottery device can obtain such a structure that the player can obtain an approximately desired result by checking the scrolled numerical values and by simultaneously adjusting the timing of the stop operation so that a desired numerical value is selected. As a result, the player's skill for the stop operation reflects on the stop position of the character more strongly. Therefore, the appearance of the event production squares can be controlled by the player's skill. This enables the player's skill to reflect on the proceeding of the game more strongly, thereby providing more succulent game in comparison with the case that the proceeding of a game is led by fortuity. The constant relationship between the timing of the stop operation and the determination of the numerical value can be established in such a manner that the time from the stop operation to the stopping of scrolling is made to be constant or a scrolling amount from the stop operation to the stopping of scrolling is made to be constant.

In the game system of the present invention, the game control device has game proceeding control device for letting a game having a story relating to a predetermined theme proceed, and the game proceeding control device lets the game proceed while the story is being changed in connection with a change in the position of the character on the route.

According to the above structure, the story changes according to determination of the value relating to the lottery device and simultaneously the game proceeds. Therefore, the player can participate in not only the stop position of the character and the event production but also a change in the story. As a result, a succulent and out of sight game, which has a high degree of freedom is different from a simple board game that a character is allowed to move along a route, can be provided to the player. As the theme, various themes may be selected similarly to the various games which are classified as so-called adventure game or simulation game.

The game control device may have ending control device, when a proceeding situation of the game satisfies a predetermined condition, for selecting an ending corresponding to the proceeding situation at that time from plural endings and presenting an image corresponding to the selected ending to the player via the display device. This enables the player to participate in the selection of the endings in the game having so-called multi endings where a plurality of endings are prepared. Further, since a characteristic of a game that the input device is operated so that an objective value can be obtained by the lottery via the lottery device is added to the selection, the contents of the game becomes wider and deeper.

The event production control device may produce a game where the player's operation skill for the input device reflects on a result of the event. This enables the player to display the skill also in the events, thereby heightening the zest of the game. As the game in this case, for example, a game that the player competes with a predetermined opponent is suitable. The opponent may be a computer or another player who operates another game system via a communication device.

The game control device may have practice providing device, when the character stops in a specified position on the route, for providing a practice environment of a game to be executed as the event to the player. In this case, the player can enjoy practices of the game so that the zest of the game is heightened. Further, a player who is inexperienced in the game gets a skill naturally while the game proceeds, and can enjoy the game sufficiently.

The ending control device may select the ending in connection with an experience in the event up to the ending. In this case, in order to reach a desired ending, the player sufficiently examines the necessity of the experience in desired events and should carefully instruct the lottery device to produced the desired events. As a result, the movement of the character according to the lottery by means of the lottery device and its result can attract the interest of the player more strongly.

In the game system of the present invention, when the character stops one of the squares, the peculiar value control device may increase the peculiar value relating to the event production corresponding to the attribute of the square where the character stops by a predetermined amount, and when the peculiar value reaches a predetermined value, the event production square appearance control device may allow the event production squares corresponding to the peculiar value to appear on the route. In this case, in order to produce a desired event, it is necessary to instruct the lottery device so that the character stops on a square having the attribute corresponding to the event and increase the peculiar value relating to the event production more than the peculiar values of production of another events. As a result, the lottery via the lottery device and the movement of the character corresponding to the lottery result attract the interest of the player more strongly.

The event production control device may produce an event relating to the event production square under the condition that the character stops on the event production square. As a result, in the case where a desired event production square appears, an instruction is given to the lottery device so that the character stops on that square, and thus a relationship between the lottery result and the event production can be easily grasped.

The present invention is realized as a computer readable storage medium. Such a storage medium into which a program for executing a game by referring to an output from an input device of a game system and displaying a game picture according to a proceeding situation of the game on a screen of a display device of the game system is recorded, is characterized in that the program allows a computer provided in the game system to function as: route presenting device for displaying a route composed by arranging a plurality of squares as well as symbols representing attributes allocated to the respective squares on the screen of the display device; lottery device for determining a value to be obtained by the player based on the instruction of the player via the input device; character position control device for moving a character set as an object to be operated by the player along the route according to the value determined by the lottery device; peculiar value control device for controlling an peculiar value relating to the event production corresponding to the attributes of the squares based on a stop position of the character; event production square appearance control device for controlling appearance of the event production squares (squares on which 25A, 25B . . . 25D are displayed) on the route based on the peculiar value; and event production control device for producing an event relating to the event production square under the condition that the event production square and the stop position of the character establish a predetermined relationship.

According to the storage medium of the present invention, the program is executed by reading it by the computer so that the computer can serve as the game control device in the game system of the present invention.

In the present invention, the character to be operated by the player may be displayed in various forms such as piece, person and vehicle. As the symbols showing the attributes allocated to the squares respectively, various things which can be recognized visually such as figure, sign, character, pattern and color may be used. The route along which the character moves may be discriminated logically that a plurality of squares are included there, and boundaries of the respective squares are not necessarily shown in an image of the route displayed on the display device. Namely, only symbols showing the attributes of the squares on the route may be displayed on the screen of the display device. The storage medium includes a magnetic storage medium, an optical storage medium, a magneto-optical storage medium, a semiconductor storage element and another various storage device.

BRIEF DESCRIPTION OF THE DRAWINGS

FIGS. 1A, 1B and 1C are diagrams for explaining arrangements of squares in a game system according to one embodiment of the present invention.

FIGS. 5A, 8B and 8C are diagrams showing examples of lure window displayed to be overlapped on a main picture of FIG. 7.

DESCRIPTION OF THE PREFERRED EMBODIMENTS

Figure 2:
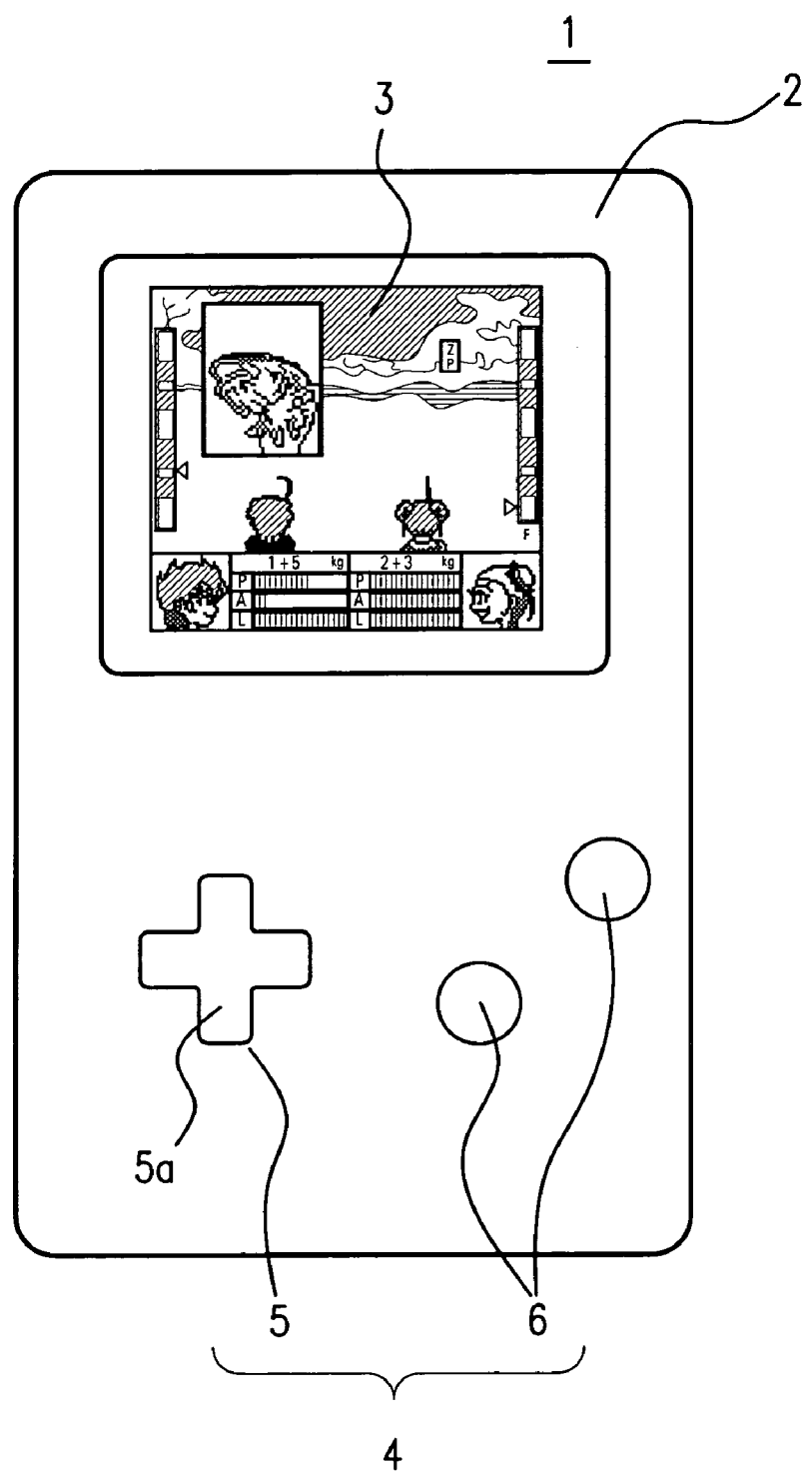
FIG. 2 is a diagram showing an embodiment of the present invention as a portable game machine.

FIGS. 1A, 1B and 1C show simple embodiments of the present invention. FIG. 1A schematically shows a route R to be displayed on a game screen. The route R is formed by arranging a plurality of squares, in which one of plural attributes A, B, C and D is set in each square, in one direction. Hereinafter, a square of the attribute A is shown as a square A, a square of the attribute B as a square B, a square of the attribute C as a square C and a square of the attribute D as a square D. A character CR which is an object to be operated by a player (called as player character) moves right along the route R by a number of squares which is equal to a value obtained by the player by means of lottery device utilizing a roulette, for example. When the character CR stops on the square A, EP points of event production characters E and F are added, and when the character CR stops on the square B, EP points of event production characters G and H are added. Moreover, when the character CR stops on the square C, EP points of event production characters I and J are added, and when the character CR stops on the square D, EP points of event production characters K and L are added. EP point stands for "Event Point", and it corresponds to an peculiar value relating to production of events.

FIG. 1B shows a state that the EP points relating to the event production characters G, E and H exceed a predetermined value and accordingly the event production characters G, E and H appear on the square B or A. The square B or A on which the event production characters G, E and H is an event production square. When the player character CR stops on the square B or A on which the event production characters G, E and H are displayed, an event corresponding to the event production characters is produced. For example, when the player character CR stops on the square B where the event production character G appears, an event relating to the character G such as competition or conversation with the character G is produced.

When the proceeding of the game changes according to an experience degree of an event with the respective event production characters and the proceeding situation satisfies a predetermined condition, the game reaches an ending. A plural kinds of endings are prepared according to the event proceeding situation. For example, if the player character CR experiences the event relating to the event production character G at the most times, the game reaches an ending relating to the character G such as winning of competition with the character G or beating an enemy together with the character G.

According to such a system, frequency of appearance of the event production characters E through K changes according to which square the player character CR stops. When the lottery device such as a roulette is set so that a player's skill is reflected on determination of a value, a square on which the player character CR stops can be adjusted according to the player's skill purposefully, and the game can be allowed to proceed according to the player's wish. Namely, when a player displays the skill so that the player character CR stops or does not stop on a square where a specified attribute is set in the lottery by the lottery device such as a roulette, it is possible that an event production character desired by the player appears or does not appear. As a result, very wide game development can be provided according to player's preference.

Here, the condition that the event production characters appear is not necessarily limited to that EP points exceed a predetermined value, and another condition may be added. Such another condition includes an example that if the player character CR does not experience the event of the event production character G, the event of the event production character H is not produced. Further, various conditions are added according to stories or proceeding (development) of the game so that a complicated and profound game can be realized.

FIG. 1C shows an example that distribution of the attributions of the respective squares changes. A difference between a route R1 and a route R2 is that more squares with the attribute A are set on the route R1, whereas more squares with the attribute B are set on the route R2. As a result, the possibility that the event production characters E and F corresponding to the attribute A appear is higher than the possibility that the other event production characters appear on the route R1, and the possibility that the event production characters G and H corresponding to the attribute B appear is higher than the possibility that the other event production characters appear on the route R2. This setting easily enables realization of the game development centering on the events with the event production characters E and F or G and H, whereas can heighten difficulty of the game development centering on the events with the other event production characters. A route R3 is an example which has regularity that the square with the attribute C is arranged in every other square. According to this example, the player can enjoy the development that the player character stops on every other square.

There will be explained below further detailed embodiment of the present invention with reference to FIGS. 2 through 9. FIG. 2 shows an embodiment that the present invention is constituted as a portable game machine. A portable game machine 1 has a main body 2, a liquid crystal monitor 3 as a display device mounted to the main body 2, and an input device 4. The input device 4 has a direction indicating switch 5, and a plurality of push button switches 6. The direction indicating switch 5 has, for example, a cross-shaped operation member 5a and outputs signals corresponding to operations of the operation member 5a to the upward, downward, leftward and rightward directions (pushing operations of the upward, downward, leftward and rightward end portions). Such a constitution of the input device 4 is known, and various modifications can be made. For example, instead of the operation member 5*a*, push button switches may be arranged on the up, down, left and right respectively.

Figure 3:
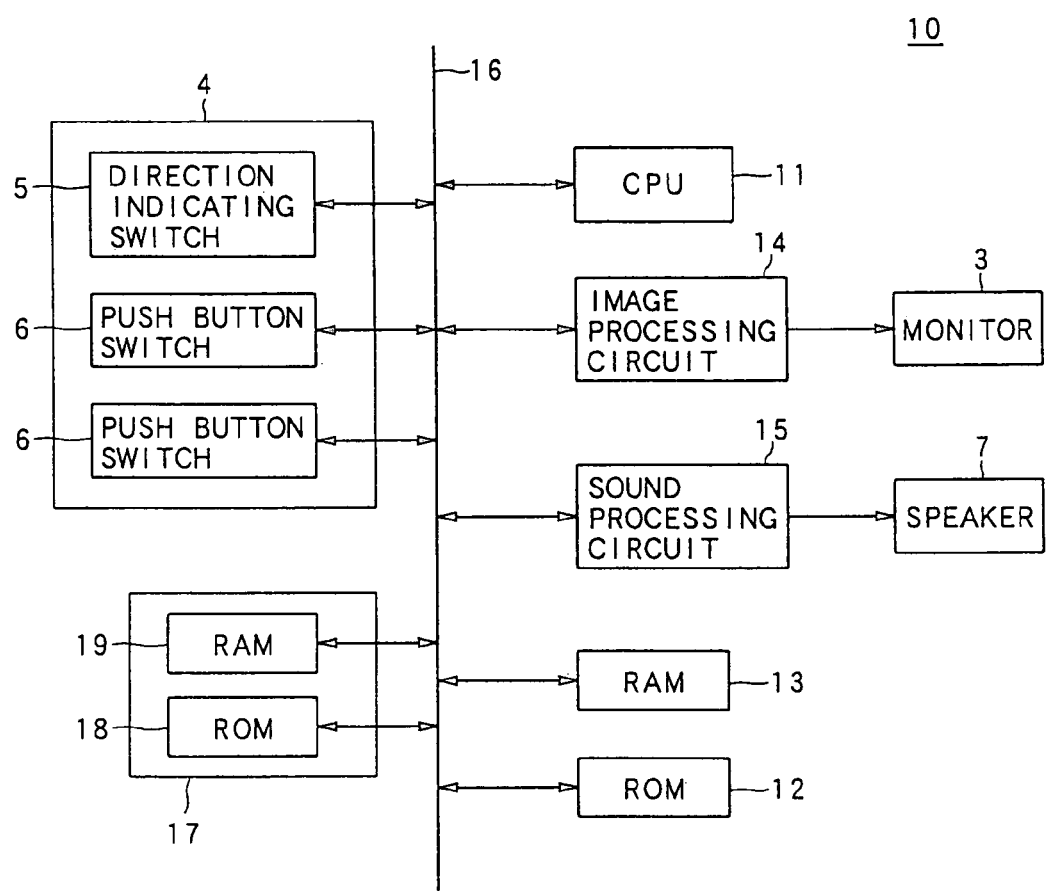
FIG. 3 is a diagram showing a schematic structure of a control device mounted to the portable game machine of FIG. 2.

FIG. 3 shows a structure of a control device 10 provided to the game machine 1. The control device 10 is constituted as a computer mainly composed of a CPU 11 utilizing a microprocessor. A ROM 12 and a RAM 13 serving as main storage devices, an image processing circuit 14 and a sound processing circuit 15 are connected to the CPU 11 via a bus 16. A program which is required for basic control of the game machine 1 (for example, activating process) is stored in the ROM 12. Work areas for CPU 11 are secured in the RAM 13. The image processing circuit 14 controls the liquid crystal monitor 3 according to a drawing instruction from the CPU 11 so as to display a predetermined image on the screen. The sound processing circuit 15 generates an analog sound signal according to a sound generating instruction from the CPU 11 so as to output it to a speaker 7.

Switches 5 and 6 of the input device 4 are connected to the CPU 11 via the bus 16, and as a result the CPU 11 can discriminate operation states of the switches 5and 6. Moreover, an external storage device 17 separated from the control device 10 is connected to the bus 16. The external storage device 17 is constituted as of, for example, a cassette type which can be freely attached to and detached from the main body 2, and a ROM 18 and a RAM 19 as storage media are provided therein. Programs for making the control device 10 function as respective device of the present invention and various data required for executing the programs are previously recorded in the ROM 18. For example, save data of a game or the like are recorded in the RAM 19 as the need arises. The data in the RAM 19 are retained by, for example, auxiliary battery contained in the external storage device 17. Instead of the RAM 19, a rewritable ROM such as an EEPROM may be used. The storage medium of the external storage device 17 is not limited to a semiconductor storage element, and various storage media such as a magnetic storage medium, an optical storage medium, a magneto-optical storage medium may be used. An interface circuit intervenes between the bus 16 and each element as the need arises, but they are not shown. The structure of the control device 10 is not limited to the above structure, and various control devices maybe used.

FIGS. 4 through 7 show pictures of the game executed by the programs recorded in the external storage device 17. The games which are executed by the game machine 1 of the present embodiment are composed of three parts: a board game; an adventure game; and a fishing competition game.

Figure 4A:
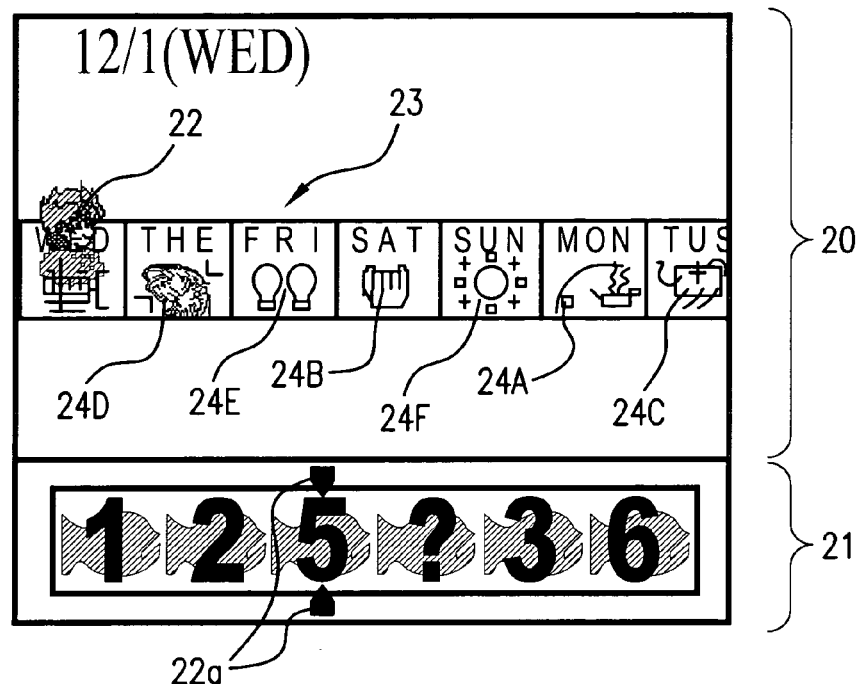
FIGS. 4A and 4B are diagrams showing examples of board game pictures displayed on the portable game machine of FIG. 2.
Figure 4B:
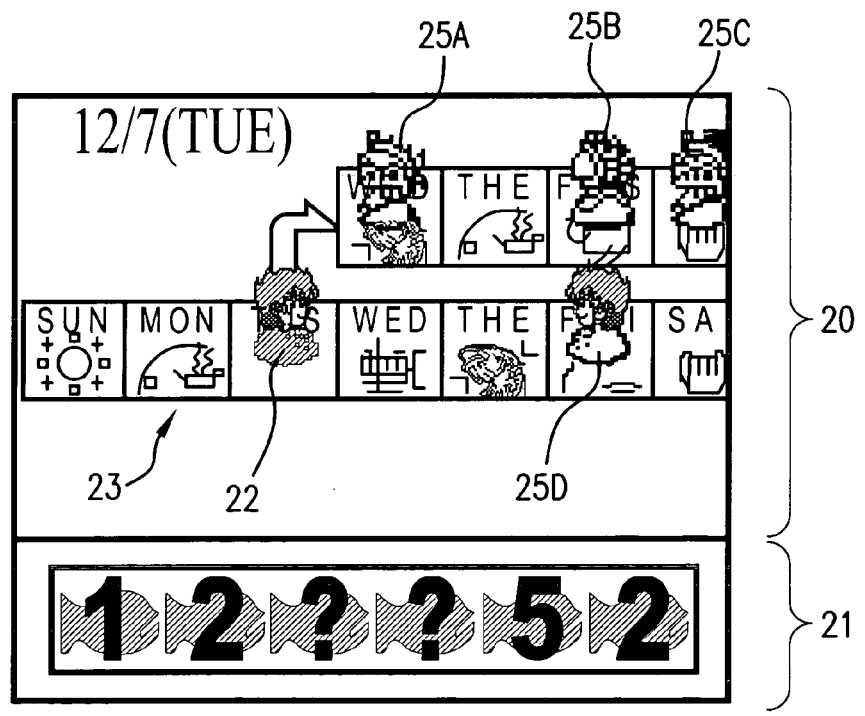

FIGS. 4A and 4B show examples of game pictures in the board game (hereinafter, referred to as a board game picture). A board game picture 100 includes a route display section 20 and a roulette display section 21. A route 23 along which a play character 22 should advance is displayed on the route display section 20. The route 23 corresponds to the route R of FIG. 1A, and is constituted by arranging a plurality of squares 24A, 24B, 24C, 24D 24E and 24F in one direction. Here, in the following explanation, when it is not necessary to distinguish the respective squares 24A through 24F from one another, they are represented by a reference numeral 24.

Characters "SUN", "MON" . . . "SAT" showing days of the week Sunday through Saturday are displayed on the squares 24 respectively according to an order of the arrangement of the squares. Moreover, marks as symbols showing attributes allocated to the respective squares 24 are also displayed on the squares 24 respectively. Casting, retrieve, hooking and fight which are elements required for fishing are allocated as attributes to the squares 24A through 24D respectively. The mark of the square 24A symbolizes casting, the mark of the square 24B symbolizes retrieve, the mark of the square 24C symbolizes hooking and the mark of the square 24D symbolizes fight.

An attribute of a forced event square is allocated to the square 24E. The player character 22 always stops on the square 24E temporarily when passing there so that a player executes the event allocated to the square 24E. An attribute of holiday is allocated to the square 24F, and the mark of the square 24F symbolizes Sunday. Here, Monday through Saturday are allocated to the squares 24A through 24E suitably and respectively, but Sunday is always allocated to the square 24F. Moreover, current date on the game is displayed on an upper left side of the route display section 20.

Numerical values in a suitable range (for example, 1 through 6) are displayed on the roulette display section 21 randomly. A question mark "?" showing an arbitrary number is occasionally included in the row of the numerical values. The roulette display section 21 is used for determining a number of the squares 24 along which the player character 22 moves. This determination is made according to the following procedure.

When the player performs a predetermined lottery operation on the input device 4, a numerical value displayed on the roulette display section 21 starts to scroll to the right-and-left direction. Thereafter, when the player performs a predetermined stop operation on the input device 4 or predetermined time has passed since the lottery operation is started, the scrolling is stopped, and a numerical value which stops in a position of a cursor 22*a* is determined as a value obtained by the player. Here, the scrolling is controlled by the CPU 11 as follows. At first, the scrolling speed is set to be within a range that the player can discriminate a numerical value during the scrolling. This range differs according to the player's skill, but it is sufficient that the range is generally set to be not more than a speed at which the respective values advances one frame in $5/60$ seconds. Moreover, time required from the stop operation on the input device 4 by the player to stopping of the scrolling is set to be constant. According to this control, the player can adjust the timing at which the scrolling stops so that a desired numerical value stops in the position of the cursor 22*a* while checking numerical values on the scrolling. Therefore, the player's skill is reflected on the determination of the value using the roulette.

When the numerical value is determined on the roulette display section 21, the player character 22 moves right on the screen by a number of the squares same as the obtained numerical value, and accordingly the route 23 is scrolled left on the screen by the same amount as the moving amount. The adventure game proceeds according to the positions determined in such a manner where the player character 22 stops.

As is clear from FIG. 4B, a branch is occasionally provided to the route 23. In this case, as to which route 23 (upper route or lower route) the player character advances is entrusted to selection by the player. Moreover, when a predetermined condition is satisfied in the board game, event production characters 25A, 25B, 25C, 25D . . . (hereinafter, occasionally represented by reference numeral 25) are displayed on any square 24 on the route 23.

Figure 5A:
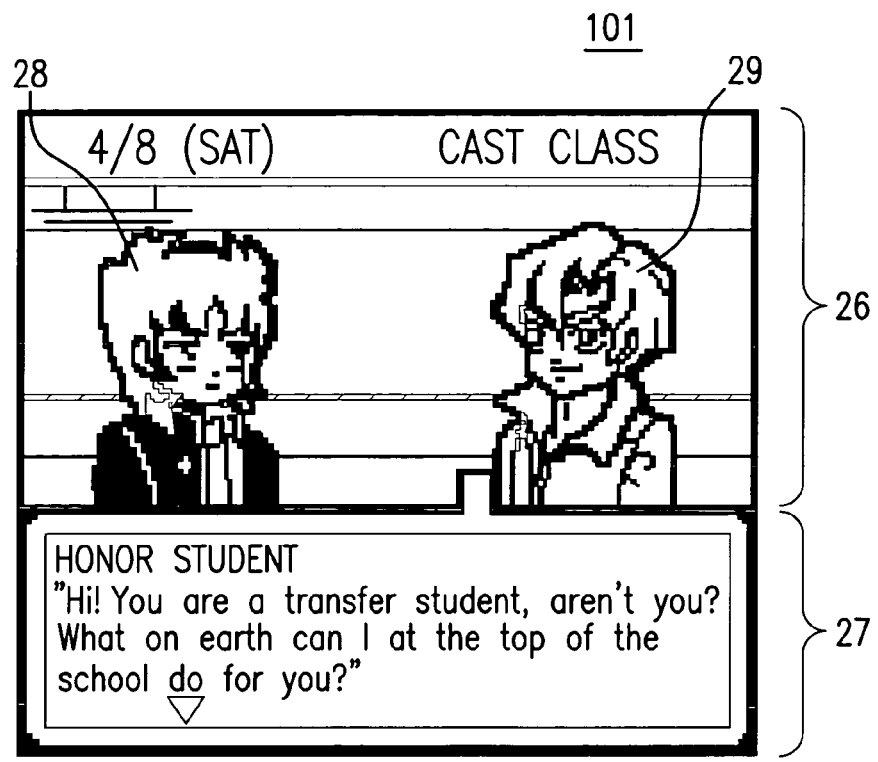
FIGS. 5A and 5B are diagrams showing examples of adventure game pictures displayed on the portable game machine of FIG. 2.
Figure 5B:
Figure 6A:
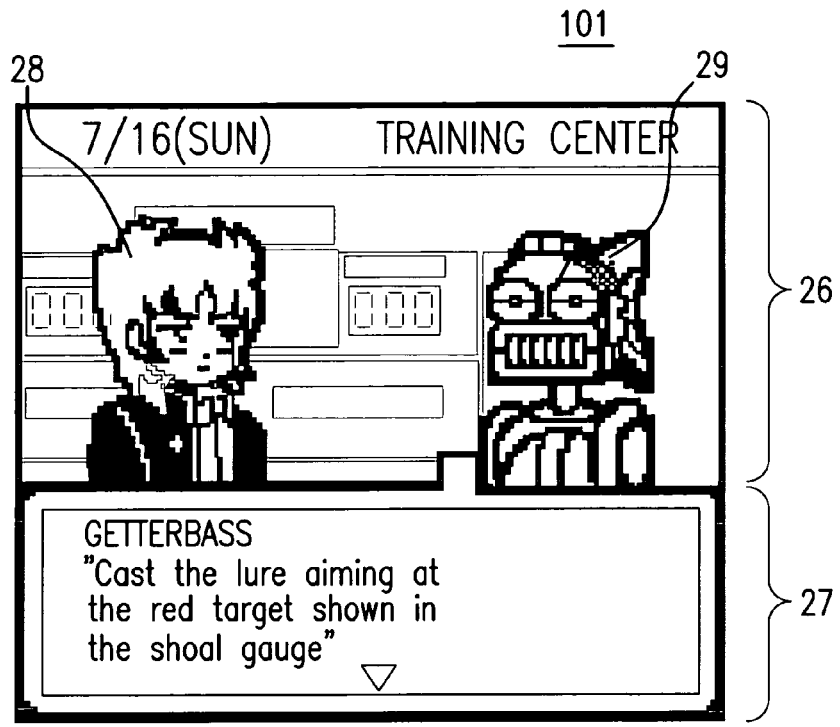
FIGS. 6A and 6B are diagrams showing other examples of the adventure game pictures displayed on the portable game machine of FIG. 2.

FIGS. 5A, 5B and 6A show examples of game pictures in the adventure game (hereinafter, referred to as adventure game picture). An adventure game picture 101 shown in these drawings includes a main display section 26 and a conversation display section 27. The adventure game proceeds along a story composed of a theme that a player enjoys school life centering on fishing. More concretely, a protagonist who is set as an object to be operated by the player transfers to a school which is set as a stage of the game and has various experiences relating to the fishing together with various characters so as to reach an ending. A plurality of endings are prepared, and a plurality of stories until the endings are prepared.

A scene according to a proceeding situation of the adventure game such as a state that a protagonist character talks with a character 29 is displayed on the main display section 26, and character strings showing contents of the conversation corresponding to the scene displayed on the main display section 26 are displayed on the conversation display section 27. The protagonist character 28 corresponds to the player character 22 on the board game picture 100. At least partial common appearance is given to both the characters 22 and 28 so that the player can recognize identity of the both characters at first sight. Similarly, the character 29 corresponds to the event production character 25, and at least partial common appearance is given to both the characters 25 and 29 so that the player can recognize identity of the both characters at first sight. Current date, comments for specifying a scene of the adventure game and the like are displayed on an upper portion of the main display section 26. The partial common appearance can be secured in such a manner that expression on the face, feature, a hair style, cloth and the like are made to be same or similar between both the characters.

The adventure game picture 101 is displayed every time when the player character 22 moves on the board game picture 100. The display contents are controlled according to an attribute of the square 24 on which the player character 22 stops. For example, the picture 101 of FIG. 5A is one example of the picture which is displayed when the player character stops on the casting square 24A. This picture shows a state that the protagonist 28 attends a class (cast class) relating to the casting and talks with the character 29 which is named as "honor student". The various adventure game pictures 101 are displayed according to the squares 24 on which the player character 22 stops on the board game picture 100, and the contents of the adventure game pictures 101 change according to the proceeding of the game successively. In the game system of the present embodiment, the position on the route 23 of the character 22 changes according to the result of the roulette in the board game, and the story proceeds relating to the change and simultaneously the adventure game proceeds towards an ending.

When the player character 22 stops on the square 24 where the event production character 25 appears on the board game picture 100, an event relating to the event production character 25 is produced. FIG. 5B shows the adventure game picture 101 which is displayed when fishing competition with the "honor student" is produced as the event as the result that the player character 22 stops on the square 24 where the event production character 25 corresponding to the "honor student" appears. After the picture 101 is displayed, the game screen is switched to a fishing competition picture 103 of FIG. 7 so that the fishing competition game is played.

FIG. 6A shows one example of the adventure game picture 101 which is displayed when the player character 22 stops on the square 24F of Sunday. The attribute of holiday is allocated to the square 24F of Sunday. When the character player 22 stops here, the player can train (practice) himself or herself for the fishing competition game. As types of the training, four types of training: an casting operation; a retrieve operation; a hooking operation; and a fighting operation are prepared correspondingly to the attributes allocated to the squares 24A through 24D respectively. The player can select one desired kind of training from them so as to play it.

Figure 6B:
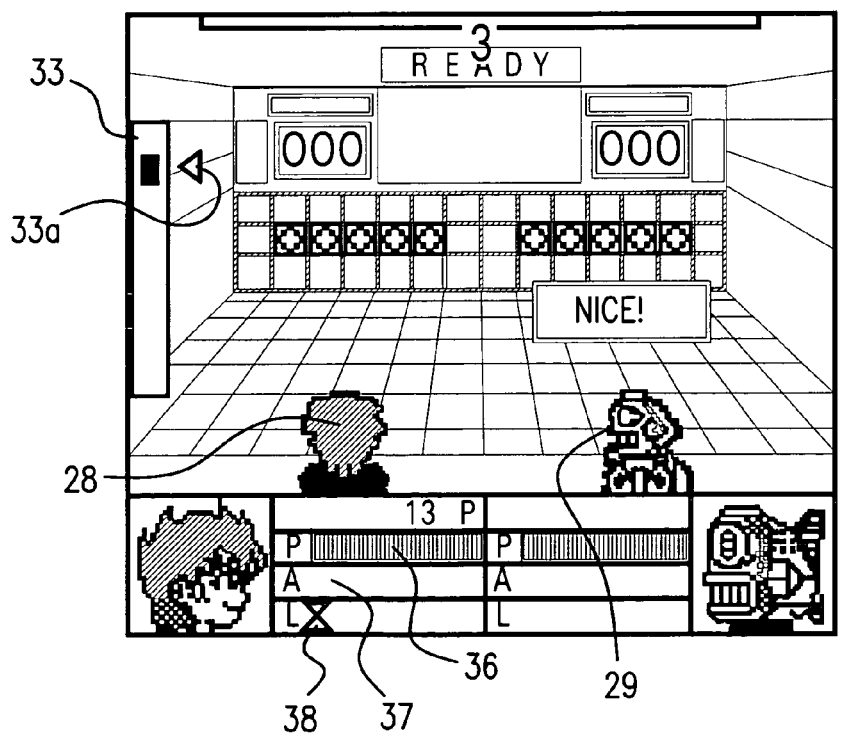

FIG. 6A is the adventure game picture 101 when the casting operation training is selected, and FIG. 6B shows a picture 102 during the training. The contents of the training will be explained after the fishing competition game. When the player character 22 stops on the square 24 of the end of the month on the board game picture 100, one of the above-mentioned four kinds of the practices is carried out as a test.

Figure 7:
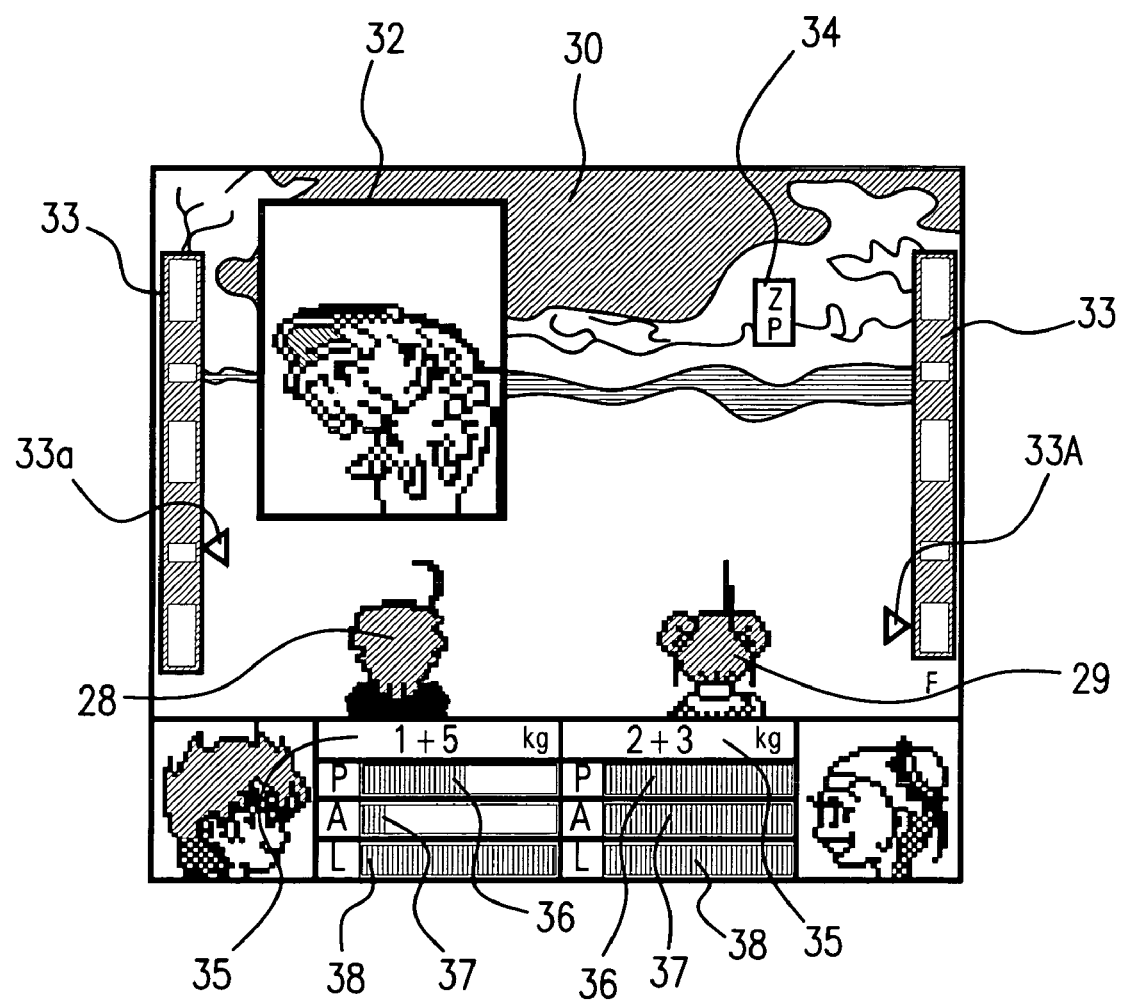
FIG. 7 is a diagram showing one example of a fishing competition picture displayed on the portable game machine of FIG. 2.

FIG. 7 shows an example of a game picture (hereinafter, referred to as fishing competition picture) on the fishing competition game. The fishing competition game picture 103 includes a main picture 30. A scene that the character 28 of the protagonist in the adventure game and the character 29 of the character as an opponent fish side by side is displayed on the main picture 30. The player who holds the game machine 1 operates the protagonist character 28 via the input device 4 so as to execute the casting and retrieve of a lure are executed and can compete with the other character 29 for the fishing. The character 29 is controlled by the CPU 11, for example. In the case where a communication device is provided to the control device 10, a player who operates another game machine 1 may operate the character 29.

Sub screens such as an animation window 32 and the like are overlapped to be displayed on the main picture 30 as the need arises. The sub screens are used for displaying operation guidance, various kind of information and the like about the lure. The sub screen is deleted when its display is not necessary. Here, the animation window 32 of FIG. 7 is for displaying a state that a fish attacks the lure. Shoal gauges 33 are displayed on the right and left sides of the main picture 30. The shoal gauge 33 is elongated in up and down direction, namely, is rectangular, and distribution of fishes from the characters 28 and 29 to the pointer 34 is shown thereon.

Namely, the lower end of the shoal gauge 33 corresponds to a position of the character 28 or 29, and the upper end corresponds to a position of the pointer 34. A distance from the lower end of the shoal gauge 33 corresponds to the distance from the character 28 or 29 on a line connecting the character 28 or 29 and the pointer 34. The inside of the shoal gauge 33 is divided into reverse portions and colored portions (for example, displayed with red), and the colored portions indicate places where fish exist. Moreover, a triangular cursor 33a indicates a current position of the lure.

The pointer 34 is displayed as a mark of the casting direction at the time when the characters 28 and 29 cast the lure. In order to clarify the distinction between the characters 28 and 29, a character "1P" is displayed on the pointer 34 of the protagonist character 28 on the left side, and a character "2P" is displayed on the pointer 34 of the opponent character 29 on the right side. In FIG. 7, only the pointer 34 of the character 29 on the right side is displayed.

Fishing result meters 35, power meters 36, appeal meters 37 and line tension meters 38 are displayed under the main picture 30. Numerical values which represent a mass of the fishes caught by the characters 28 and 29 are displayed on the fishing result meter 35. A casting power of the characters 28 and 29 is displayed on the power meter 36. When the meter 36 indicates the left end, the power is minimum, and when the meter 36 moves to the right end, the power becomes maximum.

The casting positions of the lures of the characters 28 and 29 are determined in connection with the powers displayed on the power meter 36 and the positions of the pointer 34. Namely, when the lure is cast, the power meter 36 extends and contracts repeatedly with uniform period. The pointer 34 moves to the right-and-left direction on the main picture 30 according to a predetermined casting direction selecting operation via the input device 4 (preferably an operation to the right-and-left direction on the direction indicating switch 5). Just when the player performs a predetermined casting operation (for example, a pushing operation on the push button switch 6), a reaching distance of the lure is calculated in proportion to the powers displayed on the meter 36 at that time. The lure is cast into the position corresponding to the calculated reaching distance on the line connecting the character 28 or 29 and the pointer 34.

The appeal meter 37 is used for showing a degree of appeal of the lures with respect to fishes, and post suitability/unsuitability of the retrieve operation to the player. When the meter 37 indicates the left end, a degree of appeal is the minimum, and when the meter 37 moves to the right end, the degree of appeal becomes the maximum. Fish cannot be caught except when the degree of appeal is the maximum. As the player operates the lure according to a lure action guided via a lure window 50 illustrated in FIG. 8 more faithfully, the degree of appeal rises further.

Figures 8A, 8B, 8C:
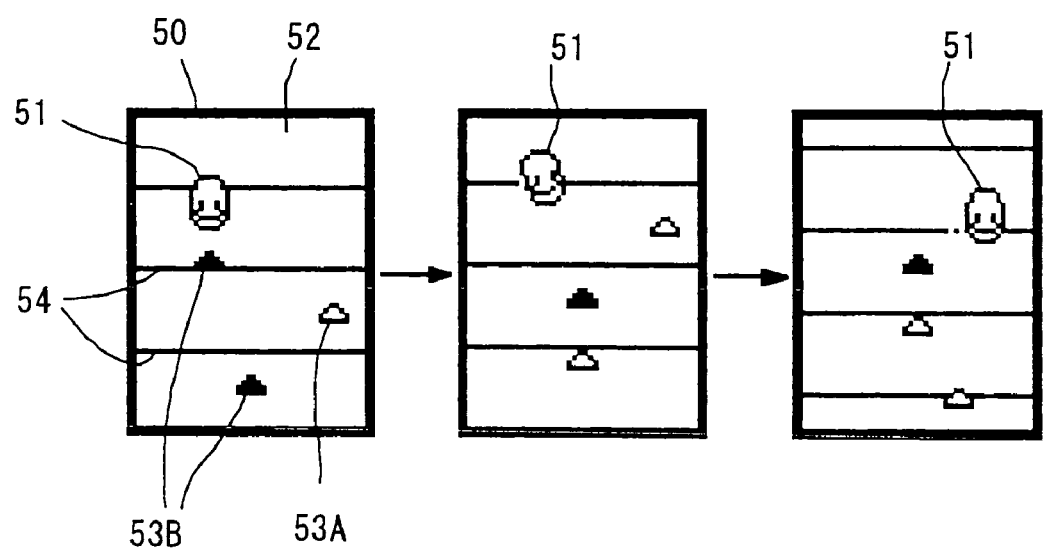

When the player operates the character 28 to cast the lure, the lure window 50 is displayed as a sub screen on the main picture 30 correspondingly to the character 28 to be operated. The lure window 50 is displayed for guiding the player in the lure retrieve operation. In FIG. 8, in order to show changes of display contents on the lure windows 50 with time, the three windows 50 at different time are displayed. The time passes in the order of A→B→C in FIG. 8.

The lure window 50 shows a state that an abstract lure 51 swims on or in water viewed from above. A downward direction of the window 50 is a direction that the lure 51 advances (collecting direction). The display position of the lure window 50 is above the character 28 or 29, and for example, in the case where the operation of the lure is guided for the character 28 on the left side in FIG. 7, instead of the window 32, the lure window 50 is displayed on the position of the animation window 32. As shown in FIG. 8, a background 52 as well as the lure 51 is displayed on the lure window 50, and triangular marks 53A and 53B are displayed as images functioning as aims showing passing positions of the lure 51 on the background 52. Moreover, a plurality of division lines 54, . . . , 54 which extend to the right-and-left direction (crossing direction) of the lure window 50 with uniform intervals, are displayed on the background 52. The lure window 50 is not limited to the examples shown in the drawing, and it may show a state that the lure 51 moves on a vertical section from the surface of the water to the bottom of the water, for example.

The lure 51 moves to the right-and-left direction on the lure window 50 according to a predetermined route changing operation on the input device 4. The route changing operation in this case is imaged by an operation such that a fishing rod is shaken right and left so that a lure is moved right and left in actual fishing. Therefore, it is desirable that the operation of the direction indicating switch 5 to the right-and-left direction is allocated as the route changing operation. The background 52 as well as the marks 53A and 53B and the division lines 54 is scrolled to be displayed at a predetermined speed from the bottom towards the top on the window 50. The scrolling of the background 52 represents a state that the lure 51 moves right and left according to the route changing operation on the input device 4 and is simultaneously collected (retrieved) towards the character 28.

The marks 53A and 53B show passing positions of the lure 51 when a suitable action is given to the lure 51. Moreover, the marks 53A and 53B are distinguished by colors. When the player operates the lure 51 right and left so as to be capable of letting the lure 51 pass on the mark 53A, the degree of appeal (the value of the appeal meter 37) rises. Moreover, when the lure 51 passes on the mark 53B, accordingly a predetermined appeal operation (link operation) is performed so that the degree of appeal rises. The appeal operation is imaged by an operation such that the fishing rod is flapped above and the lure 51 is moved up and down, and it is desirable to set an operation to the upward direction by means of the direction indicating switch 5, for example, as the appeal operation. When the lure 51 misses the mark 53A or the appeal operation is not performed suitably, the degree of appeal is lowered.

When the degree of appeal is the maximum and the lure passes the position where fish exist, the fish react to and attack the lure. At this time, the animation window 32 shown in FIG. 7 is displayed as a sub screen on the main picture 30. When the player performs a predetermined hooking operation on -the input device 4 (for example, an operation for pushing the push button switch 6) according to timing that a fish displayed on the animation window 32 swallows the lure and closes its mouth, the hooking is successful.

The hooked fish is caught by performing a suitable fighting operation by the player on the input device 4. For example, in the case where the line tension is increased because the fish struggles or the like, accordingly the state of the tension meter 38 changes. For this reason, the player temporarily holds a winding operation accordingly or operates the direction indicating switch 5 so as to slant the fishing rod to the opposite side to a direction that the fish runs. As a result, the player can catch the fish without cutting the line. When the fighting operation is unsuitable, the line is cut or the fish comes off the lure so that the player fails to catch the fish.

In the practice in the above-mentioned adventure game, the casting operation, the retrieve operation (operation according to the display on the lure window 50), the hooking operation and the fighting operation which are used in the fishing competition can be practiced individually. For example, the shoal gauge 33 is displayed as shown in FIG. 6B in the casting operation, and it is requested that the casting operation is performed so that the lure is cast into the colored portion of the gauge 33. The player checks the display of the power meter 36 and simultaneously repeats the casting operation so as to be capable of acquiring a relative relationship among the display of the power meter 36 and the timing of the casting operation and a flying distance of the lure.

Illustration is omitted hereinafter, but when the retrieve operation is practiced, the lure window 50 appears and the player is requested to perform the retrieve operation according to the display. This practice is repeated so that the player can acquire the suitable retrieve operation. In the practice of the hooking operation, the animation window 32 is displayed, and the player is requested to perform the hooking operation according to timing that a fish closes its mouth. This practice is repeated so that the player can acquire timing of the suitable hooking operation. In the fighting operation, in the state that the hooking is successful, display of the animation window 32 is started, and a state that the fish struggles is expressed and the tension meter 38 changes accordingly. The player is requested to perform the fighting operation according to these displays, and repeats this so as to be capable of acquiring the suitable fighting operation.

Figure 9:
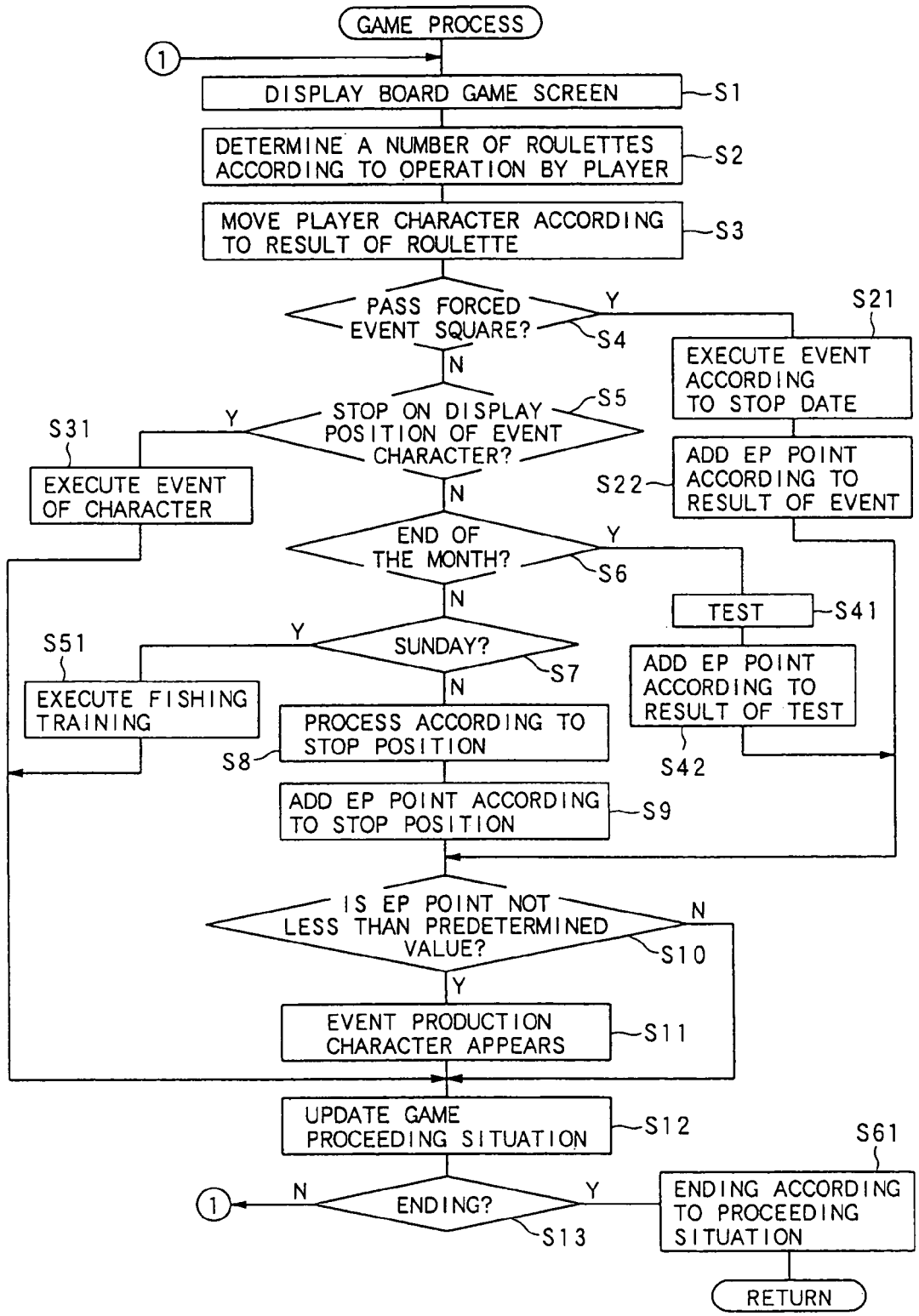
FIG. 9 is a flowchart showing a procedure of a game process executed by a CPU of the control device of FIG. 3.
Figure 10A:
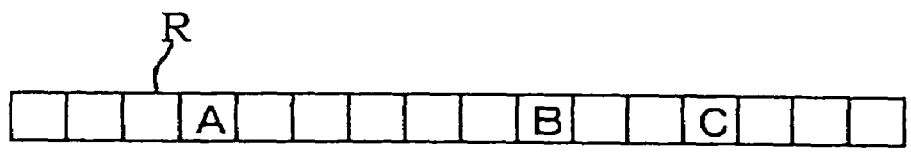
FIGS. 10A and 10B are diagrams showing arrangement of event production squares in a conventional game system.
Figure 10B:
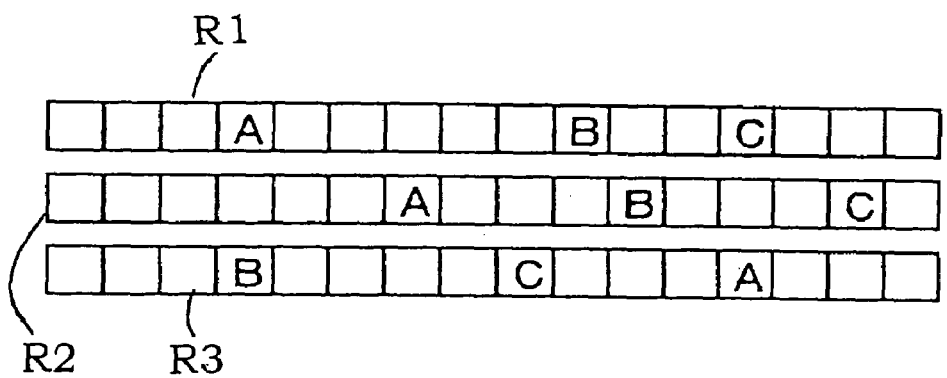

FIG. 9 is a flowchart showing a procedure of the game process executed by the CPU 11 according to the programs stored in the external storage device 17. The flowchart in the drawing shows a mutual relation among the board game, the adventure game and the fishing competition game and omits details of the process of the respective games.

When the game is started, first the board game picture 100 is displayed (step S1), and a lottery is executed on the roulette display section 21 according to the operation by the player (step S2). The player character 22 advances along the route 23 according to the value obtained by the roulette (step S3). Next, a judgment is made as to whether or not the player character 22 passes the forced event square 24E (step S4). When the judgment is made as NO, a judgment is made as to whether or not the player character 22 stops on the square (event production square) 24 where the event production character 25 appears (step S5). When this judgment is made as NO, a judgment is made as to whether or not the player character 22 stops on the end-of-the-month square 24 (step S6).

When the player character 22 does not stop on the end-of-the-month square, a judgment is made as to whether or not the player character 22 stops on the Sunday square 24F (step S7). When this judgment is made as NO, the process according to the attribute of the square 24 where the player character 22 stops is executed (step S8). This process is a process such that the adventure game picture 101 is displayed as illustrated in FIG. 5 and the protagonist character 28 attends a class and talks with the character 29, namely, a process for allowing the adventure game proceed according to stop positions.

The EP points relating to the event production character 25 corresponding to the attributes of the squares 24 where the player characters 22 stops are added (step S9). The addition of the EP points was described with reference to FIGS. 1A and 1B. For example, in the case where the square 24A is related with the event production characters 25A and 25B, the EP points relating to the event production characters 25A and 25B are added. An amount of addition may be constant or may be changed according to situations. The EP points are stored per event production characters 25 independently so as to be recorded in the RAM 13. The stored values are retained in the external storage device 17 as the need arises.

Next, a judgment is made as to whether or not the added EP point is not less than a predetermined value (step S10), and when the judgment is made as YES, the event production character 25 of which the EP point is not less than the predetermined value appears on the route 23 (step S11). At this time, for example, in the case where the EP point relating to the event production character 25 corresponding to the square 24A allocated to the casting becomes not less than the predetermined value, the event production character 25 appears on the square 24A with the same attribute positioned after the current position of the player character 22. A number of the squares 24 where the event production character 25 appears may be one or plural. In the case where a plurality of event production characters 25 have correspondence to one kind of the square 24A, predetermined values for their appearance may be the same or may be different per character. For example, the character 25A may appear when the EP point becomes not less than 50, and the character 25B may appear when the EP point becomes not less than 60. After the process at step S11, the sequence goes to step S12.

When the judgment is made at step S4 that the player character 22 passes the forced event square 24E, the player character 22 stops on the square 24E, and an event corresponding to the date allocated to the square 24E is executed (step S21). After the event, the EP point is added according to the result of the event (step S22). Thereafter, the sequence goes to step S10.

When the judgment is made at step S5 that the player character 22 stops on the display position of the event production character 25, the sequence goes to step S31 and an event related to the event production character 25 is executed. A typical example of the event is the fishing competition with the event production character 25, but the event is not limited to this. However, when the player character 22 stops on the square 24 other than the event production square, a process for letting the game such as class, conversation or the like executed at step S9 progress and the event executed at step S31 are distinguished definitely. In the process at step S9, for example, so to speak, a passive process for displaying a static image prepared in advance and implanting a sense that the adventure game proceeds in the player is executed. On the contrary, in the event at step S31, a game such as the fishing competition that the player's skill is reflected on the result of the event is executed. After the process at step S31, the sequence goes to step S12.

When the judgment is made at step S6 that the player character 22 stops on the end-of-the-month square 24, the sequence goes to step S41 so that a test is conducted. This test presents one exercise of the casting operation, the retrieve operation, the hooking operation and the fighting operation to the player, and a judgment is made as to whether or not the player clears the exercise on a not less than predetermined level. As to which test is assigned is previously determined for each month.

When the test is completed, the EP point is added according to the result (step S42). For example, in the case where the player character 22 obtains a result not less than the predetermined level in the casting operation test, the EP point of the event production character 25 corresponding to the square 24A related to the casting is added. After the process at step S42, the sequence goes to step S10.

When the judgment is made at step S7 that the player character 22 stops on the Sunday square 24F, a fishing training is carried out (step S51). In this process, the player selects one of the casting operation, the retrieve operation, the hooking operation and the fighting operation, and a practice environment relating to the selected operation is provided. When the fishing training is completed, the sequence goes to step S12.

At step S12, various parameters, which are recorded in the RAM 13 in order to specify the proceeding situation of the game, are updated according to the current proceeding situation of the game. For example, a parameter showing a current position of the player character 22 or a parameter relating to a situation that the event production character 25 appears is updated. In the case where the protagonist character 28 talks with the character at step S9, a parameter which represents a degree of close friendship to the character is added. In the case where the event is executed at step S21 or S31, a parameter showing the experience in the event, or a parameter showing a result of the event is updated. In the case where the test is conducted at step S41, a parameter showing a result of the test is updated. Further, various parameters are prepared so that the proceeding situation of the game may be judged from various viewpoints. In such a manner, the parameters are set so as to be distinguished according to the character, event, an outcome of the fishing competition, and combinations of them show the proceeding situation of the adventure game. The parameters are retained in the external storage device 17 as the need arises.

At next step S13, a judgment is made as to whether or not conditions that the game reaches an ending according to the updated parameters are satisfied. When the judgment is made that the conditions of an ending are satisfied, an ending according to the proceeding situation of the game at that time is shown on the monitor 3 (step S61). As a result, the game process ends. Plural kinds of endings are prepared, and an ending to be used is determined according to a proceeding situation of the game at that time. The proceeding situation may be judged according to, for example, a distribution situations of the stop position of the character 22 up to the ending, the stored EP point per event production character 25, an event experience situation and the like. The event experience situation may be judged based on as to whether or not the player character experiences the prepared events or based on the results of the events. The event experience may be judged by synthesis of experience or non-experience of the events and the results of the experienced events.

In the above processes, the arrangement of the squares 24A through 24E on the route 23 may be previously determined by a game creator and written into the external storage device 17. Or in another manner, the squares 24A through 24E may be produced randomly by using random numbers. The events may be produced not only when the character 22 stops on the event production squares but also when the character 22 stops in a predetermined allowable range on the event production squares. The contents of the events may differ between when the character 22 stops on the event production squares and when the character 22 stops in a constant range before and after the event production squares.

The present invention is not limited to the above-mentioned embodiments, and may be carried out in various forms. For example, the adventure game is not limited to one which is related to school life, and may be constituted according to various themes. For example, the adventure game may be constituted by exploration, sports and love as the themes. The competition game is not limited to fishing, and it can be variously changed into fighting game, racing game and the like.

As mentioned above, according to the game system of the present invention, a lottery is executed based on an instruction of a player via the input device, and a number of squares on which a character moves is determined based on the obtained value, and an peculiar value relating to the event production is controlled according to a position where the character stops, and appearance of the event production squares is controlled based on the peculiar value. For this reason, the player can participate in the appearance of the event production squares so that the player's wish can be reflected on the event production more effectively than a conventional game system. As a result, the game can proceed according to the player's wish so that the player can develop the game freely according to player's preference.

In addition, according to the storage medium of the present invention, the programs recorded therein are read by a computer so as to be executed, and thus the control device of the game system of the present invention can be realized.

What is claimed is:

1. A game system, comprising:
an image display device;
an input device for outputting a signal according to an operation by a player;
a storage device; and
a game control device for executing a game according to a predetermined program while checking the output of the input device and displaying a game picture according to a proceeding situation of the game on the display device,
wherein the game control device is further configured for implementing the steps of:
displaying a route composed by arranging a plurality of character stop areas as well as symbols representing attributes allocated to the respective character stop areas on a screen of the display device;
determining values obtained by a lottery based on inputs of the player via the input device;
repeatedly moving a character, set as an object to be operated by the player, along the route character stop areas corresponding in number to the values determined by the lottery to character stop areas corresponding to stop positions;
storing up in the storage device an event production amount, relating to event production, corresponding to the attributes of the character stop areas of the stop positions, each time the character moves to one of the stop positions;
determining whether the event production amount corresponds to a predetermined value condition;
changing display of at least one of the character stop areas, ahead of the character, from a first display state to a second display state when it is determined that the event production amount corresponds to the predetermined value condition, the second display state designating the at least one character stop area as an event production character stop area indicating an event production is required to take place when a stop position of the character coincides with the at least one of the character stop areas, wherein the first display state does not indicate that the event production is required; and
producing the event production corresponding to said event production character stop area when said event production character stop area and the stop position of the character coincide.

2. A game system according to claim 1, wherein an operation skill of the player for the input device reflects on determination of the values determined by the lottery.

3. A game system, comprising:
an image display device;
an input device for outputting a signal according to an operation by a player;
a storage device; and
a game control device for executing a game according to a predetermined program while checking the output of the input device and displaying a game picture according to a proceeding situation of the game on the display device,
wherein the game control device is further configured for implementing the steps of:
displaying a route composed by arranging a plurality of character stop areas as well as symbols representing attributes allocated to the respective character stop areas on a screen of the display device;

determining values obtained by a lottery based on inputs of the player via the input device, said step of determining including the steps of:

scrolling a row of numerical values in a predetermined range on the screen of the display device at a speed in a range that respective values can be discriminated, and selecting the value to be obtained by the player from the row of the scrolled numerical values so that a constant relationship is established between timing that a predetermined stop operation as the instruction is performed on the input device and the determination of the value;

repeatedly moving a character, set as an object to be operated by the player, along the route character stop areas corresponding in number to the values determined by the lottery to character stop areas corresponding to stop positions;

storing up in the storage device an event production amount, relating to event production, corresponding to the attributes of the character stop areas of the stop positions, each time the character moves to one of the stop positions;

determining whether the event production amount corresponds to a predetermined value condition;

changing display of at least one of the character stop areas, ahead of the character, from a first display state to a second display state when it is determined that the event production amount corresponds to the predetermined value condition, the second display state designating the at least one character stop area as an event production character stop area indicating an event production is required to take place when a stop position of the character coincides with the at least one of the character stop areas, wherein the first display state does not indicate that the event production is required; and producing the event production corresponding to said event production character stop area when said event production character stop area and the stop position of the character coincide.

4. A game system according to claim 1, wherein the game control device is further configured for letting a game having a story relating to a predetermined theme proceed, and for letting the game proceed while the story is being changed in connection with a change in position of the character on the route.

5. A game system according to claim 4, wherein the game control device is further configured to determine when a proceeding situation of the game satisfies a predetermined condition and to select an ending corresponding to the proceeding situation at that time from plural endings and to present an image corresponding to the selected ending to the player via the display device.

6. A game system according to claim 1, wherein the player's operation skill for the input device reflects on a result of the event.

7. A game system according to claim 6, wherein the game control device is further configured for providing a practice environment of a game activity which is to be executed as the event production to the player, when the stop position of the character coincides with a predetermined position on the route.

8. A game system according to claim 6, wherein the game control device selects the ending in connection with an experience in the event production leading up to the ending.

9. A game system, comprising:
an image display device;
an input device for outputting a signal according to an operation by a player;
a storage device; and
a game control device for executing a game according to a predetermined program while checking the output of the input device and displaying a game picture according to a proceeding situation of the game on the display device,
wherein the game control device is further configured for implementing the steps of:

displaying a route composed by arranging a plurality of character stop areas as well as symbols representing attributes allocated to the respective character stop areas on a screen of the display device;

determining values obtained by a lottery based on inputs of the player via the input device;

repeatedly moving a character, set as an object to be operated by the player, along the route character stop areas corresponding in number to the values determined by the lottery to character stop areas corresponding to stop positions;

storing up in the storage device an event production amount, relating to event production corresponding to the attributes of the character stop areas of the stop positions, each time the character moves to one of the stop positions;

determining whether the event production amount corresponds to a predetermined value condition;

changing display of at least one of the character stop areas, ahead of the character, from a first display state to a second display state when it is determined that the event production amount corresponds to the predetermined value condition, the second display state designating the at least one character stop area as an event production character stop area indicating an event production is required to take place when a stop position of the character coincides with the at least one of the character stop areas, wherein the first display state does not indicate that the event production is required; and producing the event production corresponding to said event production character stop area when said event production character stop area and the stop position of the character coincide, wherein when the character stops on one of the character stop areas of the stop positions, the event production amount is increased by a predetermined amount associated with the attribute of the character stop area of the stop position, and the predetermined condition determined is that the event production amount.

10. A computer readable storage medium into which a program for executing a game by referring to an output from an input device of a game system and displaying a game picture according to a proceeding situation of the game on a screen of a display device of the game system is recorded, wherein the program allows a computer provided in the game system to perform the steps of:

displaying a route composed by arranging a plurality of character stop areas as well as symbols representing attributes allocated to the respective character stop areas on a screen of the display device;

determining values obtained by a lottery based on inputs of the player via the input device;

repeatedly moving a character, set as an object to be operated by the player, along the route character stop areas corresponding in number to the values determined by the lottery to character stop areas corresponding to stop positions;

storing up in the storage device an event production amount, relating to event production, corresponding to the attributes of the character stop areas of the stop positions, each time the character moves to one of the stop positions;

determining whether the event production amount corresponds to a predetermined value condition;

changing display of at least one of the character stop areas, ahead of the character, from a first display state to a second display state when it is determined that the event production amount corresponds to the predetermined value condition, the second display state designating the at least one character stop area as an event production character stop area indicating an event production is required to take place when a stop position of the character coincides with the at least one of the character stop areas, wherein the first display state does not indicate that the event production is required; and producing the event production corresponding to said event production character stop area when said event production character stop area and the stop position of the character coincide.

11. A game system according to claim 1, further comprising:

the attributes of the character stop areas respectively corresponding to event occurrences different than the event production; and producing a corresponding one of the event occurrences of the character stop areas when the respective character stop area coincides with one of the stop positions.

12. A game system according to claim 11, wherein the event production supercedes production of the corresponding one of the event occurrences when the respective character stop area coincides with one of the stop positions and the respective character stop area is the event production character stop area.

13. A game system according to claim 12, wherein the event production is a competition involving an activity.

14. A game system according to claim 13, wherein the event occurrence is a practice session for the activity of the event production.

15. A game system according to claim 11, wherein the event occurrences include a practice session for an activity of the event production.

16. A game system according to claim 15, wherein the event production is a competition involving the activity.

17. A game system according to claim 3, further comprising:

the attributes of the character stop areas respectively corresponding to event occurrences different than the event production; and producing a corresponding one of the event occurrences of the character stop areas when the respective character stop area coincides with one of the stop positions.

18. A game system according to claim 17, wherein the event production supercedes production of the corresponding one of the event occurrences when the respective character stop area coincides with one of the stop positions and the respective character stop area is the event production character stop area.

19. A game system according to claim 18, wherein the event production is a competition involving an activity.

20. A game system according to claim 19, wherein the event occurrence is a practice session for the activity of the event production.

21. A game system according to claim 17, wherein the event occurrences include a practice session for an activity of the event production.

22. A game system according to claim 21, wherein the event production is a competition involving the activity.

* * * * *